Figure 3:
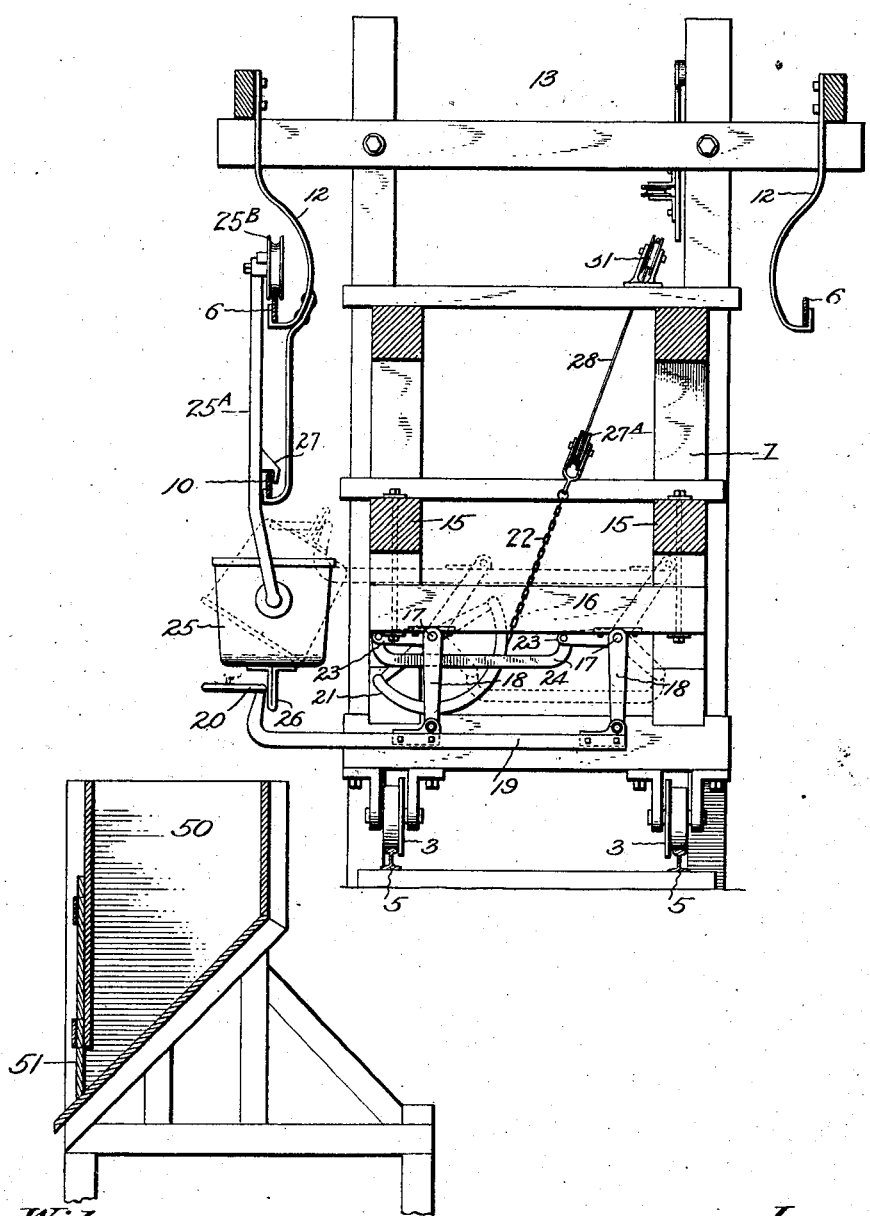

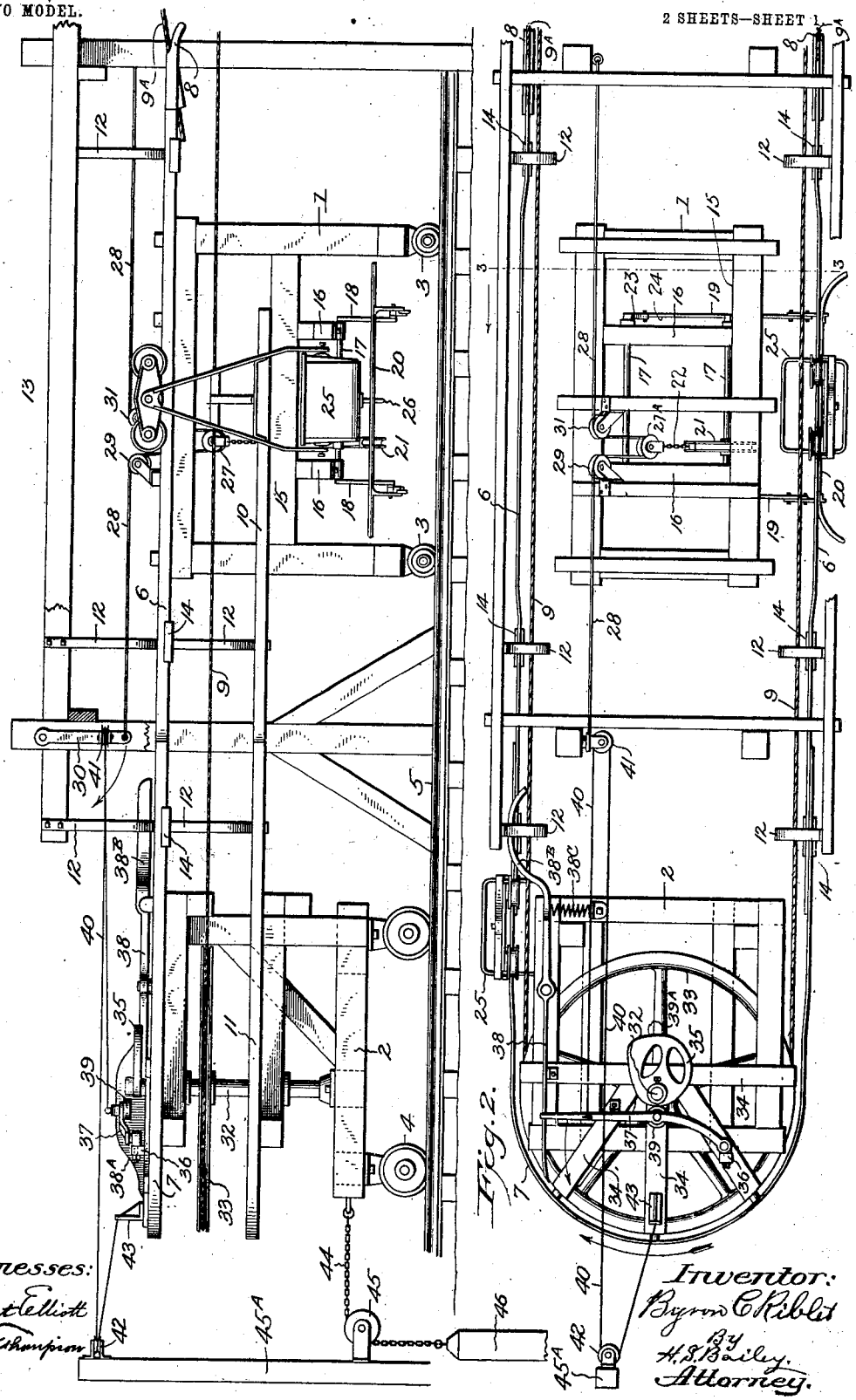

No. 742,235. Patented October 27, 1903.

UNITED STATES PATENT OFFICE.

BYRON C. RIBLET, OF SPOKANE, WASHINGTON.

DISCHARGE-TERMINAL FOR WIRE-ROPE TRAMWAYS.

SPECIFICATION forming part of Letters Patent No. 742,235, dated October 27, 1903.

Application filed November 24, 1902. Serial No. 132,657. (No model.)

*To all whom it may concern:*

Be it known that I, BYRON C. RIBLET, a citizen of the United States of America, residing at Spokane, in the county of Spokane and State of Washington, have invented certain new and useful Improvements in Discharge-Terminals for Wire-Rope Tramways; and I do declare the following to be a full, clear, and exact description of the invention, such as will enable others skilled in the art to which it appertains to make and use the same, reference being had to the accompanying drawings, and to the figures of reference marked thereon, which form a part of this specification.
This invention relates to improvements in discharging-terminals for wire-rope tramways.

The object of the invention is, first, to provide a discharging-terminal adapted to discharge the buckets at predetermined points, as when it is desired to fill a series of bins or one long bin, which is divided into compartments; second, to provide a new and novel means of dumping the buckets; third, to provide a movable platform or truck upon which the operating-sheave at the dumping-terminal is mounted, which truck is mounted upon rollers and is connected by chains or cables with heavy weights, which will exert a constant pull on the truck, and thus keep the running rope of the tramways at a proper tension. I attain these objects by the mechanism illustrated in the accompanying drawings, in which—
Figure 1 is a side elevation of my improved extensible bucket-dumping terminal. Fig. 2 is a plan view thereof. Fig. 3 is a sectional view on the line 3 3 of Fig. 2.

Referring to the accompanying drawings, the views illustrate the discharging-terminals of wire-rope tramway, which in the present instance comprises a movable platform or truck 1, which carries the bucket-dumping mechanism, and a second truck 2, upon which is mounted the sheave around which the running rope passes, and the trip device by which the dumping mechanism is operated and with which it is flexibly connected. These trucks are mounted upon flanged wheels 3 and 4, respectively, which travel on a track 5, the two trucks being thus maintained in perfect alinement. Above the top of truck 1 and independent of the same are secured tracks 6, which form continuations of the stationary rope, and at the top of truck 2 is secured a track 7, which is curved in a semicircle concentric with the sheave of the running rope 9, the ends extending a suitable distance beyond the truck on the same horizontal plane as the track 6 and in alinement therewith. The adjacent ends of tracks 6 and 7 are designed to have a telescopic connection with each other. In Figs. 1 and 2 the length of tracks is proportionally very short, allowing only a very limited movement of truck 1; but in practice these tracks would be long enough to permit of the truck being moved thirty or forty feet in either direction. At a suitable distance below the tracks 6 and 7 are guide-rails 10 and 11, the rail 10 being secured to a fixed support, while the rail 11 is secured to truck 2. These rails also have telescopic engagements with each other. The opposite ends of tracks 10 do not extend beyond the truck 1, and these tracks, together with tracks 6 and 7, are supported at the points of their telescopic connection and at intervals throughout their length by arms 12, which depend from a suitable supporting structure 13, which is independent of the trucks 1 and 2. These arms 12 are bent, as shown in Fig. 3, so as to be out of the path of the trolley-wheels of the bucket.

The truck 1 is made up of heavy timbers and is substantially of the form shown in the drawings. To the under side of the lower horizontal side timbers 15 of the truck are secured cross-beams 16, to which the dumping mechanism is secured. This dumping mechanism comprises a pair of shafts 17, which are journaled in bearings secured to the under side of the cross-beams 16 and are located near the opposite sides of the truck; vertically-depending crank-arms 18, which are keyed one to each end of the shafts; horizontal arms 19, one of which is pivotally connected to each pair of crank-arms; a combined guide and tilting-rod 20, which connects the forward ends of the arms 19, its ends being curved outward, as shown, and a segment-sheave 21, which is keyed to the forward shaft 17 and has one end of a chain 22 secured thereto. The shafts 17 have supplemental crank 23 keyed thereon, which are connected by an arm 24, the function of which cranks and arm will hereinafter be explained.

The buckets 25 are supported by a pendant 25$^A$ and a trolley 25$^B$. The trolley runs on the stationary rope, and on entering the terminal runs from the stationary rope onto the track 6 and around the terminal on the track 7 as these two tracks telescope together. The pendant of the bucket is connected to the running rope by either a fixed clip, such as is shown in patents issued to me October 23, 1900, or, if preferred, by any of the friction-grips in common use. I do not illustrate any connection between the running rope and the bucket, as the devices used for connecting the two do not form any part of my present invention. The buckets are of the form in general use and are each provided upon the bottom with a downwardly-depending pin 26. As the bucket enters the terminal from the stationary rope 9$^a$ its motion is first retarded, and then it is brought to a standstill at a point centrally of the length of the truck 1, when it is in position to be dumped. The buckets may be stopped by hand as they run onto the terminal, or, if preferred, mechanism may be employed to automatically detach them from the running rope and stop them at a predetermined point on the track. Mechanism of this character is in use on tramways; but as it does not form any part of my invention I do not illustrate it. When the bucket reaches the truck, the pin 26 contacts with the outwardly-curved end of the tilting-rod 20, and the bucket is guided so that a hook 27, which is attached to the bucket-arms, will engage the rail 10, and the bucket will thus be prevented from swinging away from the truck. As soon as the bucket comes to standstill the chain 22, attached to segment-sheave 21, will be drawn upon by mechanism to be hereinafter described, and the shaft 17, to which the segment-sheave is keyed, will be turned, carrying with it the crank-arms 18 and the horizontal arms 19, to the forward ends of which the tilting-rod 20 is secured. This rod contacts with pin 26 at the under side of the bucket, and as it is moved to the position shown in dotted lines, Fig. 3, the bucket will be dumped and the parts comprising the dumping mechanism will drop by gravity to their normal position. Power exerted upon the forward shaft 17 will also be transmitted to the rear shaft through the supplemental cranks 23 and arm 24, which connects the cranks, and the said arm and cranks will then form an auxiliary means for turning the two shafts in unison.

The chain 22, which is attached at one end to the segment-sheave 21, has attached at its opposite end a yoke which carries a sheave 27$^A$, around which a chain or wire rope 28 is passed. One end of this chain or rope passes up and over a sheave 29, which is carried by a yoke secured to the top of truck 1, whence it extends toward truck 2 and is secured to the lower end of an arm 30, which is pivoted at its upper end to the supporting structure 13. The other end of this chain or rope also passes up and over a sheave 31, similar to sheave 29, and which is also carried by a yoke which is secured to the top of the truck. Thence it extends to the opposite end of the supporting structure 13, to which it is securely attached. It will thus be seen that when the arm 30 is moved in the direction of the arrow, Fig. 1, the rope 28 will be drawn upon and will exert a pull on sheave 27, which is secured to the end of chain 22. This chain will in turn rotate the segment-sheave 21, which will effect the dumping of the bucket in the manner before described. It will be noted that the truck 1 may be moved in either direction without affecting the tension of the rope 28, which slips through the sheaves 27, 29, and 31 as the truck is moved.

The truck 2 is also constructed of heavy timbers and is provided with suitable bearings, in which is mounted a vertical shaft 32, which carries a sheave 33, around which the running rope 9 of the tramway passes. To the top of the truck are secured radiating arms 34, to which the semicircular portion of track 7 is secured, and to the upper end of shaft 32 is keyed or otherwise rigidly secured a cam 35, which lies just above the arms 34. Secured to one of the arms 34 is a short post or bracket 36, to which one end of a lever 37 is attached in such a manner as to have both an up-and-down and a lateral swinging movement. This lever extends across the top of the truck in the path of the cam 35, but normally above the same, and its free end rests upon the raised portion of a trip-arm 38, which is pivoted to the top of the truck. The lever 37 is provided on its under side with a friction-roller 39, which is designed to be engaged by the cam 35, and near its free end is attached a chain or wire rope 40, which extends to and around a sheave 41, carried by the arm 30, which is pivoted to the structure 13. After passing around the sheave 41 the rope 40 extends in an opposite direction to and around the sheave 42, secured to a fixed support 45$^A$ beyond and independent of the truck, and its edge is made fast to a bracket 43, attached to one of the arms 34 of the truck. The raised portion of the trip-arm 38 inclines downward at 38$^A$ to its forward end, while its rear end is outwardly bent, as shown at 38$^B$, so as to lie just above the track 7 and in the path of the trolley-wheel of the bucket. Now as the bucket travels around and out of the terminal by means of the running rope 9 its trolley-wheels will contact with the outwardly-bent end 38$^B$ of the trip-arm 38 and will push the said end in or out of its path. The opposite end of the arm, having the raised portion upon which the end of lever 37 rests, will be thrown out, the lever will drop and its friction-roller 39 will be engaged by the cam 35, the lever will be moved in the direction of the arrow and will draw upon the rope 40, which passes around sheave 41, attached to the arm 30. The arm 30 will be moved to one side and will draw upon the rope 28, which will exert a pull on chain 22, attached to the segment-sheave 21, and the bucket will be turned almost completely over, as shown in dotted lines in Fig. 3, and the ore therein will discharge into the bin 50. The length of this bin is equal to the travel of the dumping-car end of the terminal 1, which might vary from about fifty to several hundred feet. In discharging into the bin the dumping-car could be placed at one end of it—say the bucket-entering end of the terminal—where it is allowed to stand until the bin at this point is full, when an attendant rolls the dumping-car along several feet, and the car is allowed to stand at this point until the bin is filled up at this point. This is repeated until the dumping-car reaches the opposite end of the long bin. At the same time that the bin is being filled from one end to the other it is also being emptied through the gates 51 from the full end, and the ore is shipped to treatment plants. In practice I have an attendant move the dumping-car a certain distance—say four feet—every day at a stated hour—say twelve o'clock—and make the bin large enough to receive the ore that is discharged from any one position of the dumping-car in that time. When the dumping-car has reached the opposite end of the bin, it is run all the way back to the end of the terminal and started forward again on the end of the bin, which should be emptied a portion of its length at this end at the same time the opposite end is filling. The cam 35 will carry the lever 37 beyond the end of the trip-arm 38, and the periphery of the cam is such that just as the bucket is dumped the roller 39 will engage a concentric portion 39$^A$, formed on the cam, which will hold the bucket tipped up a moment or two before it begins its return movement. The cam will then allow the lever to return, and its free end will then travel up the incline 38$^A$ of the trip-arm, and its friction-roller 39 will then be lifted above the plane of cam 35 and out of engagement with the same. The lever will then rest upon the raised portion of the trip-arm until the said arm is again acted upon by the trolley-wheels of a passing bucket, when the operation effecting the dumping of the bucket will be repeated. The trip-arm is held in its normal position by a spring 38$^C$. In case the cam 35 as it rotates lies underneath the lever 37 and the roller 39 when the lever drops off the trip-arm 38 the roller 39 will drop and will rest onto the face of the cam until the cam has moved from under the roller and lever, when the roller will drop down by the face of the cam into operative relation with its edge. Then the cam will engage it and move it to tip and discharge the bucket.

The outer end of the truck 2 has a chain 44 attached thereto to pass over a sheave 45, attached to a fixed support 45$^A$, and a heavy weight 46 is secured to the end of the chain. The weight exerts a constant tension upon the running rope 9 as the stationary rope extends to and is secured in any suitable manner to the end of the terminal tracks 6, while the running rope is an endless rope and extends around the sheave-wheel 33. In this manner variations in the tension of the running rope due to the loads in the bucket are immediately corrected by the automatic rolling or travel of the truck 2, and the rope is thus maintained at an even tension. As the truck is moved back and forth by the variations in the tension of the rope its tracks 7 and 11 will telescope with tracks 6 and 10, and the rope 40 will slip through the sheaves 41 and 42 without moving either the arm 30 or the lever 37, to which its ends are attached.

The invention herein described is simple and thoroughly reliable and is in practical use on a tramway some fifteen miles long, which has an ore-bin ninety feet long and that is capable of transporting and discharging several hundred tons of ore per day.

Having fully described my invention, what I claim as new, and desire to secure by Letters Patent, is—

1. In a discharging-terminal for wire-rope tramways, the combination with the running and stationary ropes of a movable truck having bucket-dumping mechanism secured thereto, a second movable truck, having a sheave mounted thereon round which the running rope passes; a semicircular track, the ends of which are extended and telescope with tracks forming continuations of the stationary rope; mechanism for effecting the operation of the bucket-dumper, and a flexible connection, which connects the said mechanism with the bucket-dumper, substantially as shown.

2. In a discharging-terminal for wire-rope tramways, the combination with the running and stationary ropes, of a movable truck having a bucket-dumper arranged thereon, bucket-guiding rails located below the running rope; a second movable truck in alinement with the first-mentioned truck, having a sheave mounted thereon, round which the running rope passes; a semicircular track, the ends of which are extended and have telescopic connection with the tracks forming continuations of the stationary rope; a semicircular guide-rail having extended ends which telescope with the guide-rails of the above-mentioned trip mechanism for operating the bucket-dumper; a cable connecting the said mechanism with the dumper, and means for operating the trip mechanism, substantially as shown.

3. In a discharging-terminal for wire-rope tramways, the combination with the bucket, running rope and stationary rope, of a truck which is mounted upon wheels; tracks secured above the truck forming continuations of the stationary rope; guide-rails located below the tracks, and a bucket-dumper arranged upon the said truck; a second truck which is mounted upon wheels so as to be in alinement with the first truck, having a sheave mounted thereon, round which the running rope passes; a semicircular track, concentric with the sheave, the ends of which are extended and have telescopic connection with the tracks forming continuations of the stationary rope; a semicircular guide-rail which is also concentric with the sheave, the ends of which are extended and telescope with the first-mentioned guide-rails; a trip mechanism comprising a cam, a lever and a trip-arm; and a cable connecting the trip mechanism with the bucket-dumper, the trip mechanism being operated by the trolley-wheels of the bucket, substantially as shown.

4. In a discharging-terminal for wire-rope tramways, the combination with the running and stationary ropes of a truck mounted upon wheels, having a bucket-dumper secured thereto, and tracks located above the said truck, which form a continuation of the stationary rope; a second truck mounted upon wheels and having a sheave mounted thereon round which the running rope passes; a semicircular track, the ends of which are extended and telescope with the before-mentioned tracks, trip mechanism comprising a cam, a lever and a trip-arm; a cable which connects the trip mechanism with the bucket-dumper, and a support independent of the trucks, having depending arms which support the said tracks, substantially as shown.

5. In a discharging-terminal for wire-rope tramways, the combination with the bucket, the running rope and the stationary rope, of a movable truck having a sheave mounted thereon, round which the running rope passes; a counterbalancing-weight connected to the truck which maintains an even tension on the running rope, a semicircular track concentric with the sheave, the ends of which extend beyond the truck; a semicircular guide-rail below the track and concentric therewith, having extended ends, and trip mechanism comprising a cam, a lever and a trip-arm upon the forward end of which one end of the said lever normally rests, the opposite end of said arm being outwardly bent so as to lie above the track and adjacent thereto; a second movable truck in alinement with the first truck, tracks and guide-rails which telescope with the tracks and rails of the first truck, the said tracks forming continuations of the stationary rope; a bucket-dumper and a cable connecting the dumper with the trip mechanism, the said mechanism being put in motion by the trolley-wheels of a passing bucket contacting with the outwardly-bent end of the trip-arm; and arms secured to an independent structure which support the said tracks and rails, substantially as shown.

6. In a discharging-terminal for wire-rope tramways, the combination with the running rope, the stationary rope and the buckets having depending pins secured to their bottoms, of a truck which carries a sheave round which the running rope passes; a counterbalancing-weight which maintains an even tension on the said running rope, a trip mechanism which is operated by the trolley-wheels of the buckets; and a semicircular track, the ends of which are extended and have telescopic connection with tracks forming continuations of the stationary rope, substantially as shown.

7. In a discharging-terminal for wire-rope tramways, the combination with the running and stationary ropes, the buckets and a tripping mechanism, of a bucket-dumper comprising a pair of shafts having a crank-arm at each end; arms pivotally connecting the cranks on each side; a tilting-rod having outwardly-bent ends, which is secured to the ends of said arms, and contacts with a depending pin of the bucket; a segment-sheave keyed to one of the shafts; a chain attached at one end to the segment-sheave, and having a sheave attached to its opposite end, a cable which passes round said sheave and over sheaves carried by the truck, one end of said cable being secured to a fixed support independent of the truck; while the other end is extended in an opposite direction and is fastened to a pivoted arm which is also secured to the said fixed support, and a cable which connects the pivoted arm with the tripping mechanism, the said mechanism being operated by a passing bucket so as to effect the movement of the bucket-dumper, substantially as shown.

8. In a discharging-terminal for wire-rope tramways, the combination with the buckets, the running rope and the stationary rope, of a movable and counterbalanced truck, having a shaft which carries the sheave round which the running rope passes; a semicircular track, concentric with the sheave, the ends of which extend beyond the truck, and a tripping mechanism comprising a cam secured upon the top of the shaft; a lever which is engaged at a predetermined time by the cam, and a pivoted trip-arm, having a raised portion at one end, which normally supports the free end of the lever, while its opposite end is outwardly bent so as to lie above the track and adjacent thereto, a second movable truck in alinement with the first truck having a bucket-dumper mounted thereon, a flexible connection extending from the dumper to a pivoted arm attached to a fixed support, and a second flexible connection extending from the arm to the lever of the tripping device, substantially as shown.

9. In a discharging-terminal for wire-rope tramways, a bucket-dumper, comprising a pair of parallel shafts having depending crank-arms secured upon their ends, connecting-arms, one of which is pivotally attached to the crank-arms at the end of each shaft; a segment-sheave which is keyed to one of the shafts; a rod having outwardly-turned ends, which is secured to the forward ends of the connecting-arms; a flexible connection attached at one end to the segment-sheave, and having a sheave secured upon its other end, and means engaging said sheave so as to exert a pull on the flexible connection and rotate the segment-sheave, causing the crank-arms, connecting-arms and rod to assume a reverse position, in combination with a support for the said bucket-dumper, which forms part of the terminal of the tramway, substantially as shown.

10. In a discharging-terminal for wire-rope tramways, a bucket-dumper comprising a pair of parallel shafts, having crank-arms secured upon their ends; a pair of connecting-arms one of which is pivotally attached to the crank-arms at the ends of each shaft; a segment-sheave which is keyed to one of the shafts; a chain attached at one end of the segment-sheave and means for drawing upon the said chain to rotate the segment-sheave, a rod having outwardly-bent ends, which is attached to the forward ends of the connecting-arms, and a supplemental device for carrying the crank-arms past a dead-center line, when the segment-sheave is turned, substantially as shown.

11. In a dumping-terminal for wire-rope tramways, the combination with the buckets having projecting pins upon their bottoms, the stationary rope, the running rope and a movable support having a shaft mounted thereon, carrying a sheave round which the running rope travels, and a circular track which is concentric with the sheave, of a cam carried by the shaft; a pivoted trip-arm, one end of which is outwardly bent so as to lie above the track and adjacent thereto, while its other end has a raised portion which inclines down to the said end; a lever pivoted at one end so as to have an up-and-down and a sidewise-swinging movement, while its forward end rests upon the raised portion of the trip-arm, the said lever lying across the path of the cam, but normally out of contact with it; a fixed support, an arm pivoted thereto having a sheave secured near its lower end, a second fixed support oppositely positioned and having a sheave secured thereto, a cable attached at one end to the forward portion of the lever, whence it passes round the sheave upon the swinging arm, thence back to and around the sheave upon the opposite fixed support after which it is made fast to the movable support; a second movable support having a bucket-dumper arranged thereon comprising shafts having crank-arms at their ends, a connecting-arm pivotally connected to each pair of crank-arms; a rod connecting the forward ends of the connecting-arms and a segment-sheave keyed to one of the shafts and having a chain attached thereto, at one end, and carrying a sheave at its other end, and a cable which passes round the said sheave, and over sheaves carried by the bucket-dumping support, the ends extending in opposite directions, and being attached, one to the swinging arm carrying the sheave, and the other to a fixed support, the trip-arm being moved by the trolley-wheels of a passing bucket to effect the movement of the bucket-dumper, through the cam, lever and cable which are connected with the said dumper, substantially as shown.

12. In a discharging-terminal for wire-rope tramways, the combination with the bucket-dumping mechanism of a trip device comprising a cam, a pivoted trip-arm having an outwardly-bent end, and a raised portion which inclines downwardly to the opposite end; a lever, one end of which is pivoted so as to have an up-and-down and sidewise-swinging movement, while its free end normally rests upon the raised portion of the trip-arm; a friction-roller secured to the lever so as to be in the path of the cam, the said roller being normally out of contact with the cam; means for engaging the outwardly-bent end of the trip-arm, at a predetermined time, so that its opposite end will move from under the lever, and allow it to drop, thus bringing its roller in contact with the cam, which will move the said lever until its free end will be beyond the inclined end of the trip-arm; means for operating the cam and means connecting the lever with the dumping mechanism, so that the said mechanism shall be operated when the lever is moved by the cam, substantially as shown.

13. In a dumping-terminal for wire-rope tramways, the combination with the stationary rope, the running rope and the buckets, of a movable truck having a sheave which carries the running rope, a semicircular track concentric with the sheaves, and counterbalancing-weights; a second movable truck positioned between the first truck and the ends of the stationary rope, and which is designed to move between track extensions of the stationary rope which telescope with the ends of the semicircular track; a bucket-dumper carried by the second truck; a trip mechanism carried by the first trucks, and a flexible connection which unites the trip and the dumper in such a manner that the tension of the same is not affected by the movements of either truck, the said trip being operated by the trolley-wheels of a passing bucket, substantially as shown.

14. In a dumping-terminal for wire-rope tramways, the combination with the running rope, the stationary rope, the operating-sheave and the buckets, of a cam carried by the shaft of the sheave; a pivotal trip-arm; a lever pivoted at one end, while its other end rests upon the trip-arm, the said lever having a friction-roller which is in the path of the cam, but normally out of contact with it; a bucket-dumper comprising parallel shafts having depending crank-arms at their ends, a connecting-arm pivotally attached to each pair of crank-arms, a rod connecting the forward ends of the connecting-arms, a segment-sheave keyed to one of the shafts, an additional crank attached to each shaft, but at an angle to the crank-arms, an arm connecting the said cranks; and a cable connecting the segment-sheave of the bucket-dumper, with the lever of the trip device, the trip-arm of said device being operated by the trolley-wheels of the passing buckets, substantially as shown.

15. In a dumping-terminal for wire-rope tramways, the combination with a bucket-dumper having an operating segment-sheave, and a trip mechanism for the dumper, comprising a cam, a lever and a trip-arm, of flexible means for connecting the lever of the trip with the segment-sheave of the bucket-dumper; means for operating the cam and means for moving the trip-arm at a predetermined time, substantially as shown.

In testimony whereof I affix my signature in presence of two witnesses.

BYRON C. RIBLET.

Witnesses:
G. SARGENT ELLIOTT,
BESSIE THOMPSON.